United States Patent [19]

Citino

[11] Patent Number: 4,706,832
[45] Date of Patent: Nov. 17, 1987

[54] HOME BAKER'S HEARTH ACCESSORY FOR BAKING OLD WORLD BREAD IN A CONVENTIONAL HOME OVEN

[75] Inventor: Salvatore Citino, Potomac, Md.

[73] Assignee: Salday Products Corporation, Rockville, Md.

[21] Appl. No.: 908,339

[22] Filed: Sep. 17, 1986

Related U.S. Application Data

[63] Continuation of Ser. No. 711,043, Mar. 12, 1985, abandoned.

[51] Int. Cl.⁴ .............................................. A21B 3/15
[52] U.S. Cl. ........................................ 220/66; 126/12; 126/22; 99/422; 99/447
[58] Field of Search ............... 126/12, 22, 246, 273.5, 126/337 R, 375; 99/422, 447; 428/45, 49; 220/66

[56] References Cited

U.S. PATENT DOCUMENTS

| | | | |
|---|---|---|---|
| 232,950 | 10/1880 | Dickinson | 126/22 |
| 312,461 | 2/1885 | Hanneman | 126/22 |
| 463,590 | 11/1891 | Zoeggele et al. | 99/422 X |
| 898,527 | 9/1908 | Thoits et al. | 126/273.5 |
| 2,385,210 | 9/1945 | Kaplan | 126/22 |

FOREIGN PATENT DOCUMENTS 32671 7/1921 Norway .............................. 126/22

Primary Examiner—Samuel Scott
Assistant Examiner—Allen J. Flanigan
Attorney, Agent, or Firm—Nixon & Vanderhye

[57] ABSTRACT

A home bakers' hearth accessory produces hearth-baked bread, pizza and the like in a common stove or range, these baked products having quality which is comparable to the breads produced in old world commercial-type bakers' ovens. An aluminum sheet formed with an upwardly extending flange on its peripheral edges contains and retains removeable quarry tiles to provide an improved means for baking perfect hearth-baked bread in a common stove or range oven.

19 Claims, 2 Drawing Figures

HOME BAKER'S HEARTH ACCESSORY FOR BAKING OLD WORLD BREAD IN A CONVENTIONAL HOME OVEN

CROSS REFERENCES TO RELATED APPLICATIONS

This application is a continuation of application Ser. No. 711,043 Filed Mar. 12, 1985, now abandoned.

BACKGROUND OF THE INVENTION

My invention relates to baking devices such as bread pans, pizza stones, and cookie sheets.

My invention converts the common kitchen stove and/or range into an "old world" commercial type bakers' oven (made of sand, firebricks and stone) with the capability of making hearth baked breads, pizza, rolls, and cookies without the need for modifications or adjustments or acts of judgement by the user, and/or spending a large sum of money for a new appliance.

The principle or quality behind hearth-baked bread (i.e., baking bread directly on heated unglazed bricks or stones) can be traced to antiquity. The idea of baking breads and related products directly on the brick hearth of an oven has been around for centuries. Attempts have been made in the past to build special stoves and baking pans to simulate the hearth baked products of antiquity, but these suffered from the expense of installation and purchase of large appliances and disappointing results.

Instead of constructing a cooking stove made entirely of bricks, sand, and stone, others have designed a stove with special features of lowering and raising hearth bricks for temperature control and a means of emitting steam into the oven. Such a stove would be impractical to install in the common kitchen and would prove too costly just to produce hearth-baked bread.

It would be highly desirable to provide an accessory to a conventional common wall oven or stove which allowed one to bake free-form bread, pizzas, rolls and the like with a quality comparable to that achievable with a commercial brick oven.

SUMMARY OF THE INVENTION

My invention provides a way to produce hearth-baked bread, pizza, and the like in a common stove or range without the need to incur great expense in modification, installation, and purchase of large appliances or the need to make adjustments or acts of judgement by the user.

My invention combines a heat-conductive sheet formed with an upwardly extending flange on its outer peripheries which contains and retains removeable, loosely fitted quarry tiles to provide an improved means for baking perfect hearth-baked bread in a common stove or range oven.

The a homebaker's hearth accessory provided by the present invention improves the usefulness of common stoves and range ovens in that it allows the oven to produce hearth-baked breads comparable in quality to the breads produced in old world commercial-type bakers' ovens. Without my invention, the common stove can only bake pan bread. Further, the accessory provided by my invention may be used to bake pizza, rolls, and other baked products with equal success. Another important useful feature of my invention is its versatility in that it may be used as a cookie sheet by simply removing the tiles and/or used as a hot plate when not in use for baking.

These and other objects and advantages of the present invention will be evident in the following detailed description of the preferred embodiment.

DETAILED DESCRIPTION OF THE PREFERRED EMBODIMENT

Figure 1:
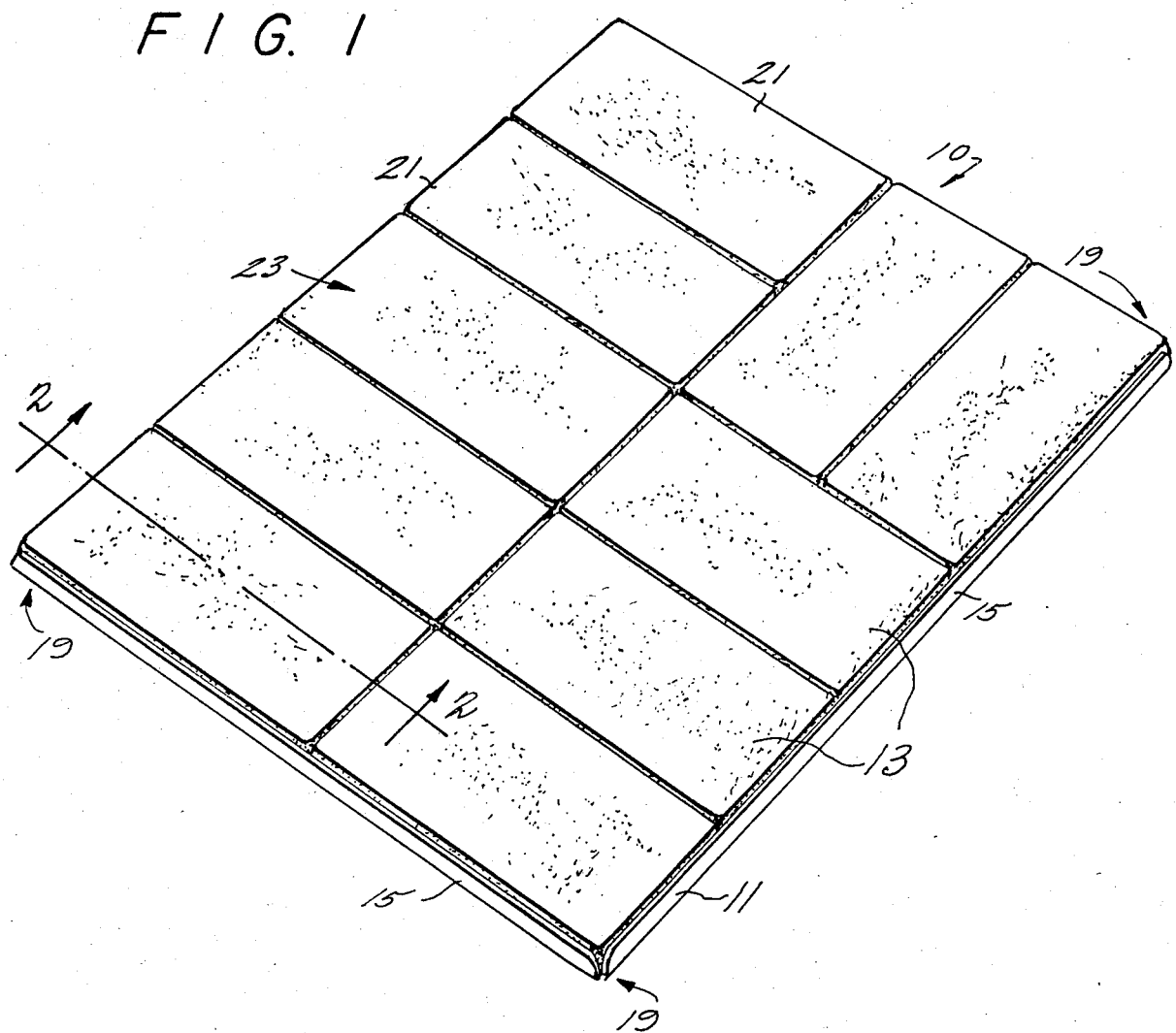
FIG. 1 is a perspective view of a Homebakers' Hearth Accessory bread baking pan according to the present invention.

FIG. 1 is a perspective view of the presently preferred exemplary embodiment of a homebakers' hearth bread baking pan 10 in accordance with my invention. Pan 10 includes a support member 11 and a plurality of tile members 13.

Support member 11 is preferably constructed of aluminum sheet metal for its effect of transferring heat to tile members 13 (and also for its lightness, ease of handling, and resistance to oxidation). Support member 11 includes four upturned edges or flange portions 15 which hold and retain tile members 13 in place on the support member (and prevent the tile members from moving laterally with respect to the support member).

In the preferred embodiment, tile members 13 are removably and loosely disposed on support member 13, and are not fastened to the support member but instead are easily removeable therefrom. The tile members 13 can be removed for easy cleaning (and/or the empty support member 11 may be used on its own in order to bake cookies).

In a preferred embodiment, each tile member 13 abuts an upwardly extending flange portion 15, and the tile members cover substantially the entire surface area of an upper planar surface 17 of support member 11.

As is clearly shown in FIG. 1, support member upwardly extending flange portions 15 are disposed on peripheral edges of support member 11, these peripheral edges adjoining support member upward planar surface 17 upon which tile members 13 rest. Upwardly extending flange portions 13 extend from these support member peripheral edges and surround and adjoin planar upper surface 17. Since support member 11 is rectangular in the preferred embodiment, these outer peripheral edges adjoin one another at corners 19 of support member 11. As shown in FIGURE 1, upwardly extending flange portions 15 are discontinuous at these corners 19 where peripheral edges adjoin (intersect) one another in the preferred embodiment.

Tile members 13 in the preferred embodiment each comprise a conventional quarry tile—that is, an unglazed, relatively thin and flat prehardened clay tile. The upper surfaces 21 of tile members 13 define a substantially flat, unglazed clay baking surface 23. As can be seen in FIG. 1, this baking surface 23 has a surface area which is substantially equal to the surface area of support member upper surface 17.

Figure 2:
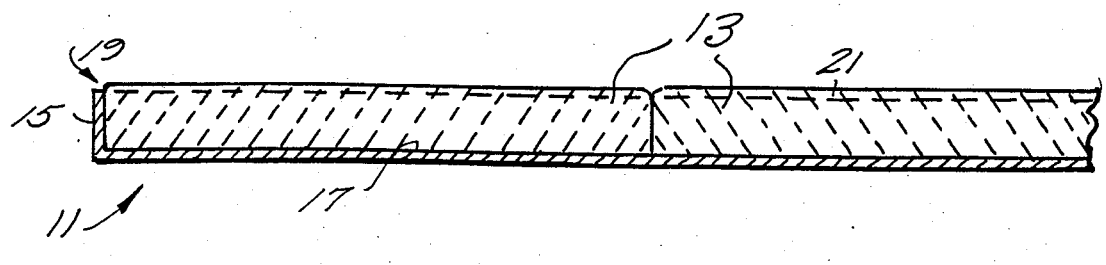
FIG. 2 is a cross-sectional view of the FIG. 1 embodiment.

As is clearly shown in FIG. 2, the height extended by flange portions 13 is not greater than the level of clay baking surface 23 (i.e., the thickness of tile members 13) in the preferred embodiment.

Support member 11 is preferably dimensioned in one of two sizes: 16"×16"; and 16"×20". These dimensions permit pan 10 to fully utilize the capacity of common wall ovens and kitchen stoves and ranges.

What is claimed is:

1. A homebakers' hearth for baking free-form bread in a common wall oven or kitchen stove to achieve a quality of bread comparable to that achievable in a commercial brick oven, said hearth comprising:

an aluminum tray defining an upper, substantially planar surface, said tray having an upwardly extending edge at the outer peripheries thereof, said edge surrounding and adjoining said upper surface; and a plurality of individual quarry tiles removeably disposed on said aluminum tray upper surface and each abutting said upwardly extending edge, said plurality of quarry tiles adjoining one another and covering substantially the entire area of said tray upper surface.

2. A homebakers' hearth according to claim 1 wherein said aluminum tray has the properties of thermal conductivity to provide uniform heat distribution to the tiles; lightness for ease in handling; and resistance to oxidation for durability.

3. A homebakers' hearth as in claim 1 wherein said upwardly extending edge is discontinuous and prevents lateral movement of said tiles with respect to the tray.

4. Apparatus for baking bread comprising:

a heat-conductive sheet defining a substantially planar surface and outer peripheral edges;

a plurality of discrete adjoining tile members removeably disposed on said sheet planar surface, said tile members covering substantially the entire surface area of said planar surface, said tile members defining an unglazed baking surface; and an upwardly extending flange means disposed at the outer peripheral edges of said sheet, said flange means surrounding and adjoining said planar surface, said flange means for preventing lateral movement of said plurality of tile members with respect to said sheet.

5. Apparatus as in claim 4 wherein pairs of said sheet peripheral edges intersect one another and said flange is discontinuous where said sheet peripheral edges intersect.

6. Apparatus as in claim 4 wherein said flange means extends a height not greater than the level of said baking surface.

7. Apparatus as in claim 4 wherein each of said tile members abuts said flange means.

8. Apparatus as in claim 4 wherein each of said tile members includes at least one edge surface abutting said flange means.

9. Apparatus as in claim 4 wherein said tile members have similar size and shape.

10. Apparatus as in claim 4 wherein said tile members each comprise a prehardened rectangular quarry tile.

11. Apparatus as in claim 4 wherein said tile members each comprise a thin, unglazed clay tile.

12. Apparatus as in claim 4 wherein said plurality of tile members together define a substantially planar unglazed clay baking surface which is parallel to said sheet planar surface and is elevated slightly above the height extended by said flange, said baking surface having a surface area which is substantially equivalent to the surface area of said planar sheet surface.

13. Apparatus as in claim 4 wherein said tile members are disjoint from said sheet and are easily removeable therefrom.

14. Apparatus as in claim 4 wherein said plurality of tiles closely adjoin one another to define a substantially continuous, flat unglazed baking surface thereon.

15. Apparatus as in claim 4 wherein said sheet is disjoint from said tile members and from structures external to said flange.

16. A break baking structure adapted for removable placement within a conventional home oven, said structure including:

a heat-conductive metallic rectangular sheet having a substantially rectangular surface terminating at four peripheral edges, said sheet having an upwardly extending flange portion at each of said four peripheral edges, said flange portions having discontinuities occurring where pairs of said peripheral edges intersect one another; and a plurality of rectangular, thin unglazed tile members removeably and loosely disposed on and covering substantially the entire surface area of said rectangular surface, said tile members being unfastened to said sheet and removeable therefrom, said tile members each abutting at least one of said flange portions and each abutting at least one other tile member, said plurality of tile members having substantially equal, uniform thicknesses, said tile member thicknesses being greater than the heights extended by said flange portions, said flange portions preventing lateral movement of said tiles with respect to said sheet.

17. A structure as in claim 16 wherein said tile members each abut at least two other tile members.

18. A kit of materials for constructing a bread baking pan comprising:

a heat-conductive sheet defining a substantially planar rectangular surface covering substantially the entire surface area of said sheet, said sheet having an upwardly extending flange disposed at the outer peripheral edges thereof and surrounding said rectangular surface; and a plurality of discrete prehardened tile members detached from and removeably and loosely disposable onto said sheet rectangular surface, said tile members each having first and second opposing surfaces, the combined surface areas of said tile member first surfaces being substantially equal in size and shape to the surface area of said sheet rectangular surface, said tile members having substantially equal, uniform thicknesses, said tile member thicknesses being at least equal to the height extended by said flange.

19. A kit as in claim 18 wherein said flange is discontinuous.

* * * * *

UNITED STATES PATENT AND TRADEMARK OFFICE
CERTIFICATE OF CORRECTION

PATENT NO. : 4,706,832
DATED : November 17, 1987
INVENTOR(S) : CITINO

It is certified that error appears in the above-identified patent and that said Letters Patent is hereby corrected as shown below:

IN THE CLAIMS:

Claim 16, line 1, "A break baking" should read --A bread baking--.

Signed and Sealed this

Twelfth Day of April, 1988

Attest:

DONALD J. QUIGG

*Attesting Officer*    Commissioner of Patents and Trademarks